United States Patent [19]

Brack

[11] 4,283,540
[45] Aug. 11, 1981

[54] PROCESS FOR THE PREPARATION OF CATIONIC NAPHTHOLACTAM DYESTUFFS

[75] Inventor: Alfred Brack, Odenthal, Fed. Rep. of Germany

[73] Assignee: Bayer Aktiengesellschaft, Leverkusen, Fed. Rep. of Germany

[21] Appl. No.: 943,473

[22] Filed: Sep. 18, 1978

Related U.S. Application Data

[63] Continuation of Ser. No. 784,360, Apr. 4, 1977, abandoned.

[30] Foreign Application Priority Data

Apr. 6, 1976 [DE] Fed. Rep. of Germany ....... 2614886

[51] Int. Cl.$^3$ .................. C07D 215/12; C07D 209/80
[52] U.S. Cl. ............................ 546/165; 260/326.5 B; 260/326.42; 260/326.62; 260/373
[58] Field of Search ............ 260/326.5 B, 373, 326.42, 260/326.62; 546/165

[56] References Cited

U.S. PATENT DOCUMENTS

| | | | |
|---|---|---|---|
| 2,768,183 | 10/1956 | Hoefle | 260/373 |
| 3,157,633 | 11/1964 | Kuhn | 260/373 |
| 3,974,178 | 8/1976 | Okhawa | 260/326.5 B |

OTHER PUBLICATIONS

Wagner et al., Synthetic Organic Chemistry, (New York, 1953), pp. 226-231.

*Primary Examiner*—Anton H. Sutto
*Assistant Examiner*—D. B. Springer
*Attorney, Agent, or Firm*—Sprung, Felfe, Horn, Lynch & Kramer

[57] ABSTRACT

Water-soluble cationic dyestuffs are prepared by the reaction of dyestuffs of the formula

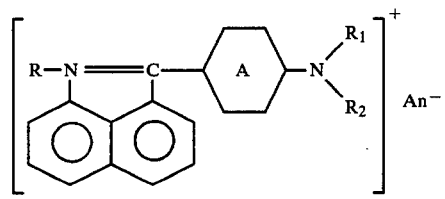

wherein
 R and $R_1$ represent alkyl,
 $R_2$ represents alkyl, aralkyl, cycloalkyl or aryl or represents alkylene which is bonded to the ring A in the o-position relative to the nitrogen atom, and
An$^-$ represents an anion, and wherein the said radicals, the ring A and the naphthalene ring can contain nonionic substituents customary in dyestuff chemistry, and wherein at least one of the radicals R and $R_1$ contains a hydroxyl group or a halogen atom or another group which can be split off as an anion, with polyhydric alcohols in the presence of a catalyst.

6 Claims, No Drawings

PROCESS FOR THE PREPARATION OF CATIONIC NAPHTHOLACTAM DYESTUFFS

This is a Continuation, of application Ser. No. 784,360, filed Apr. 4, 1977, now abandoned.

The subject of the invention is a new process for the preparation of water-soluble cationic dyestuffs by reacting dyestuffs of the formula

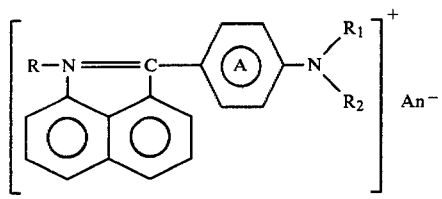

wherein
R and $R_1$ independently of one another represent an alkyl radical, $R_2$ represents an alkyl, aralkyl, cycloalkyl or aryl radical or represents an alkylene radical which is bonded to the ring A in the o-position relative to the nitrogen atom, and $An^-$ represents an anion,
and wherein the said radicals, the ring A and the naphthalene ring can contain nonionic substituents customary in dyestuff chemistry,
and wherein at least one of the radicals R and $R_1$ contains a hydroxyl group or a halogen atom or another group which can be split off as an anion,
with polyhydric alcohols in the presence of a catalyst.

Examples of suitable polyhydric alcohols are dihydroxyalkanes and trihydroxyalkanes, especially those with two primary hydroxyl groups.

Examples of suitable catalysts are aluminum oxide, active aluminas (bleaching earths) such as ® tonsil, titanium oxide and zirconium oxide, mixed oxides of the spinel type, thorium oxide, silica, say in the form of silica gel, which can be used for chromatographic purposes, active zeolites or other silicates having acid active centres, acid ion exchangers, such as polystyrenesulphonic acids, strong acids and acid-forming agents, such as sulphuric acid, phosphoric acid, polyphosphoric acid and phosphorus pentoxide, and finely divided catalytically active metals, such as platinum.

In order to carry out the process, the dyestuffs I are heated with polyhydric alcohols in the presence of at least one of the suitable catalysts to temperatures of between about 80° C. and 160° C., and preferably 125°–150° C. During the reaction, an ether bond is linked and a new dyestuff or a dyestuff mixture of corresponding structure is formed. In a preferred embodiment, the polyhydric alcohol at the same time serves as the solvent. A liquid dyestuff concentrate which is immediately ready for use and stable to cold and which must only be filtered in order to remove the catalyst is obtained by the new process.

If a catalyst which is soluble in the mixture, such as phosphorus pentoxide, is used, even the latter operation is dispensed with.

It is a particular advantage of the new process that it leads direct to a concentrated solution of a dyestuff which can be marketed as such, whilst conventional processes of preparation provide special process steps for this purpose. However, if desired, it is possible to isolate the new dyestuffs, either by subjecting the solution which is obtained to spray-drying or by diluting the solution with water and precipitating the dyestuffs as the carbinol base using basic agents, such as sodium hydroxide solution, sodium carbonate or milk of lime. The carbinol bases, which are insoluble in water, can be isolated easily and converted into dye salts again, for example by grinding with solid acids, such as amidosulphonic acid or with acid salts such as $NaHSO_4$.

It is also possible to isolate the dyestuffs in a known manner as zinc chloride double salts.

A subject of the invention which is to be singled out is a process for the preparation of cationic dyestuffs of the formula

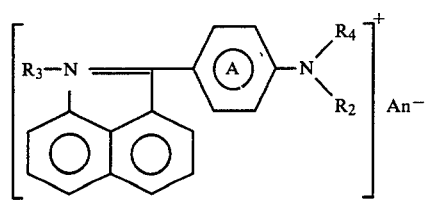

wherein
$R_3$ and $R_4$ independently of one another represent an alkyl radical, $R_2$ represents an alkyl, aralkyl, cycloalkyl or aryl radical or represents an alkylene radical which is linked to the ring A in the o-position relative to the nitrogen atom, and $An^-$ represents an anion,
and wherein the said radicals, the ring A and the naphthalene ring can contain nonionic substituents customary in dye-stuff chemistry
and wherein at least one of the radicals $R_3$ and $R_4$ contains a radical of the formula

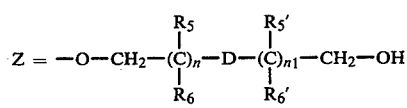

wherein
n and $n_1$ independently of one another denote 0, 1 or 2, $R_5$ and $R_5'$ independently of one another denote hydrogen, methyl, ethyl or hydroxyl, $R_6$ and $R_6'$ independently of one another denote hydrogen, methyl or ethyl, or $R_5$ and $R_6$ conjointly denote methylene or ethylidene, and D denotes a direct bond, vinylene, ethinylene, sulphur or $-O-(CH_2-CH_2-O)_x$, in which $x = 0$, 1 or 2, by reacting dyestuffs of the formula (I) with alcohols of the formula

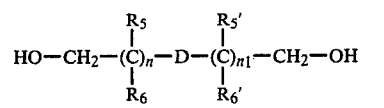

wherein
n, $n_1$, $R_5$, $R_5'$, $R_6$, $R_6'$ and D have the abovementioned meaning, in the presence of a catalyst.

In formula (I), a group which can be split off as an anion is understood as, in particular, an acyloxy, alkylsulphonyloxy or arylsulphonyloxy group, in addition to hydroxyl and halogen.

When the radical $R_2$ is linked to the o-position of ring A, it represents, in particular, ethylene or propylene (1,3), which can be substituted by lower alkyl groups or phenyl groups, preferably methyl.

Examples which may be mentioned of nonionic substituents customary in dyestuff chemistry are: halogen atoms, especially fluorine, chlorine and bromine, hydroxyl, alkoxy, acyloxy, aryloxy, mercapto, alkylmercapto, arylmercapto, aralkylmercapto, amino, alkylamino, arylamino, acylamino, nitrile, acyl, alkoxy and amidocarbonyl, alkylsulphonyl and arylsulphonyl groups and additionally, on the rings, nitro, alkyl and alkenyl groups, the said alkyl groups preferably having 1–4 C atoms and the alkenyl groups preferably having 2–4 C atoms.

Within the scope of this invention, aryl in particular represents phenyl, aralkyl in particular represents benzyl or phenylethyl, which in the phenyl ring can be substituted by the abovementioned radicals, and acyl in particular represents acetyl-propionyl or benzoyl.

Particularly preferred substituents are: fluorine, chlorine, bromine, methoxy, ethoxy, acetoxy, formyloxy, phenoxy, methyl-, ethyl, β-cyanoethyl-, phenyl-, tolyl- or chlorophenylmercapto, acetyl-, phenyl-, tolyl-, methoxyphenyl- or ethoxyphenyl-amino, cyano, methoxy, ethoxy, or amino-carbonyl and methyl- or amino-sulphonyl and, on the rings, additionally methyl and ethyl.

Possible anions are all the organic and inorganic anions customary for cationic dyestuffs. Colourless anions are preferred.

The anion is generally determined by the process of preparation and any purification of the starting dyestuffs which may be carried out. In general, the dyestuffs are in the form of halides, especially chlorides or bromides, or methosulphates, ethosulphates, sulphates, benzenesulphonates or toluenesulphonates or acetates. The anions can be replaced by other anions in a known manner.

In a preferred process, dyestuffs of the formula

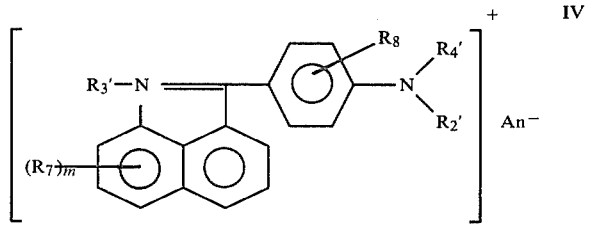

wherein —

$R_3'$ and $R_4'$ independently of one another represent $C_1$–$C_6$-alkyl, which can be substituted by a $C_1$–$C_4$-alkoxy, cyano, aminocarbonyl or $C_1$–$C_4$-alkocycarbonyl group, and at least one of the radicals $R_3'$ or $R_4'$ is substituted by the radical Z.

$R_2'$ represents $C_1$–$C_6$-alkyl, which can be substituted by a $C_1$–$C_4$-alkoxy, cyano, aminocarbonyl or $C_1$–$C_4$-alkoxycarbonyl group; or represents phenyl, cyclopentyl, cyclohexyl, benzyl or phenylethyl, which, in the rings, can be substituted by 1–5 halogen or $C_1$–$C_4$-alkyl groups or by 1 to 2 hydroxyl, $C_1$–$C_4$-alkoxy or nitro groups, $R_7$ represents $C_1$–$C_6$-alkyl, halogen, hydroxyl, $C_1$–$C_4$-alkoxy, cyano, aminocarbonyl, $C_1$–$C_4$-alkoxycarbonyl, amino, acetylamino, mono- and di-$C_1$–$C_4$-alkylamino, $C_1$–$C_4$-alkylsulphonylamino, $C_1$–$C_4$-alkylmercapto, β-cyanoethylmercapto, phenylmercapto, which is optionally substituted by chlorine or methyl, or aminosulphonyl or $C_1$–$C_4$-alkylsulphonyl, $R_8$ represents hydrogen, methyl, ethyl or $C_1$–$C_4$-alkoxy or a $R_8$ which is in the o-position relative to the nitrogen represents, conjointly with $R_2$, propylene(1,3) or ethylene, which are optionally substituted by methyl groups, m represents 0, 1 or 2 and $An^-$ represents an anion, are prepared by reacting alcohols of the formula III with dyestuffs of the formula

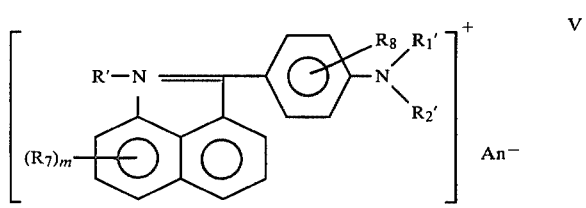

wherein

R' and $R_1'$ independently of one another represent $C_1$–$C_6$-alkyl, which can be substituted by a $C_1$–$C_4$-alkoxy, cyano, aminocarbonyl or $C_1$–$C_4$-alkoxycarbonyl group, and at least one of the radicals R' and $R_1'$ is substituted by chlorine, bromine, acetoxy or hydroxyl, especially by chlorine, and the other symbols have the meaning indicated in formula IV, in the presence of a catalyst.

Further dyestuffs which can preferably be prepared by the new process are those of the formulae

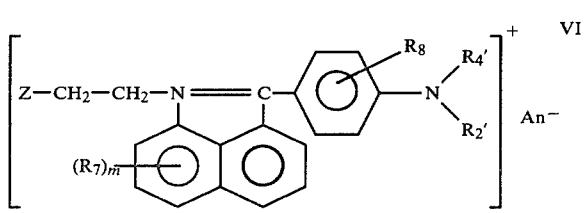

and

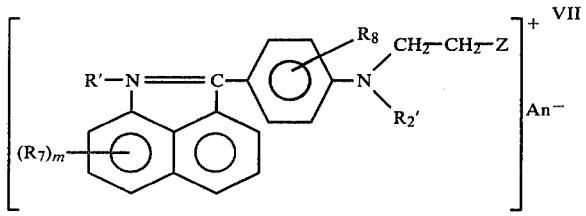

wherein the symbols have the meaning indicated in formula IV, by reacting dyestuffs of the formula V, in which R' and $R_1'$ denote hydroxyethyl or chloroethyl, with the alcohols III.

In a further preferred process, dyestuffs of the formulae

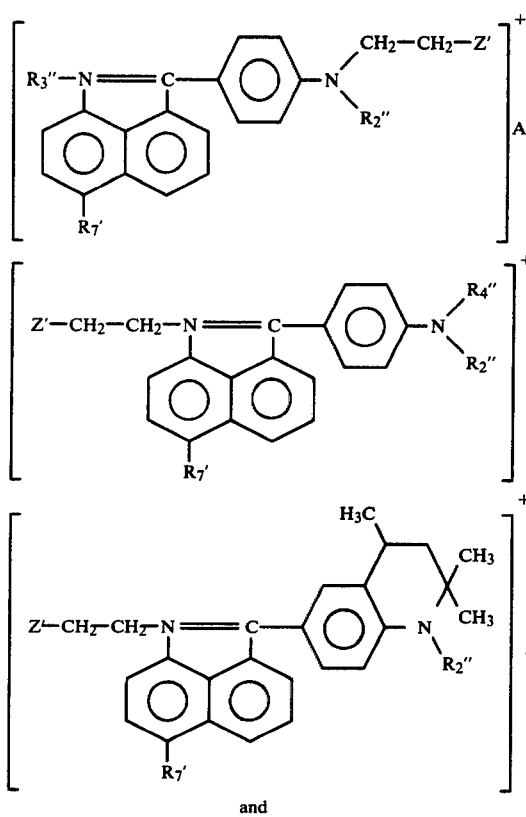

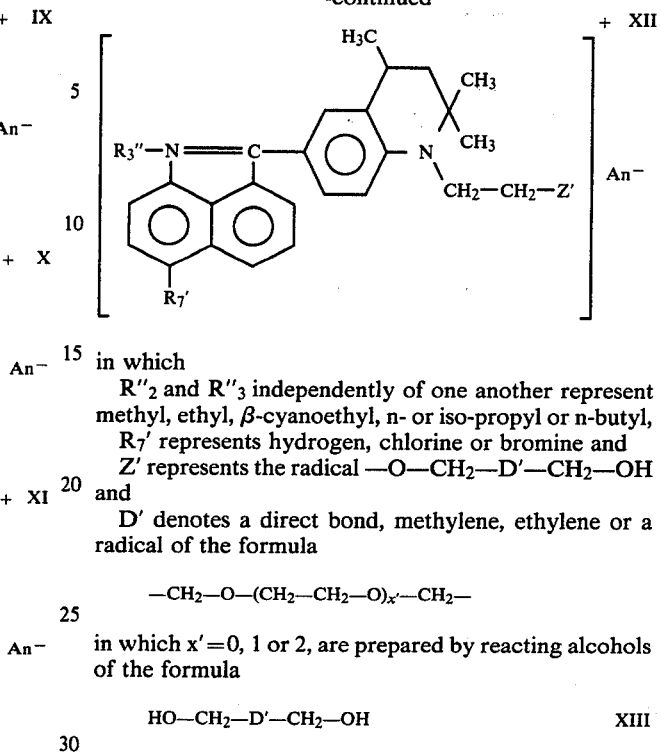

in which

R″₂ and R″₃ independently of one another represent methyl, ethyl, β-cyanoethyl, n- or iso-propyl or n-butyl, R₇′ represents hydrogen, chlorine or bromine and Z′ represents the radical —O—CH₂—D′—CH₂—OH and D′ denotes a direct bond, methylene, ethylene or a radical of the formula $$-CH_2-O-(CH_2-CH_2-O)_{x'}-CH_2-$$

in which x′=0, 1 or 2, are prepared by reacting alcohols of the formula $$HO-CH_2-D'-CH_2-OH \qquad XIII$$

wherein D′ has the abovementioned meaning, with dyestuffs which correspond to the formulae IX, X, XI and XII except that Z′ represents chlorine or hydroxyl.

The starting dyestuffs (I) are compounds which are in themselves known. They are described, for example, in German Pat. Nos. 1,165,790, 1,190,126 and 1,287,004, in DT-OS No. (German Published Specifications) 2,314,606, 2,351,296 and 2,525,113 and in S.U. Pat. No. 116,643.

Examples of suitable starting materials of the formula I are the dyetuffs described in Tables 1 and 2.

TABLE 1

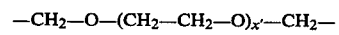

| R | R₁ | R₂ | U |
|---|---|---|---|
| methyl | β-hydroxyethyl | methyl | hydrogen |
| " | β-chloroethyl | " | " |
| " | β-bromoethyl | " | " |
| " | β-chloroethyl | ethyl | " |
| " | " | benzyl | " |
| " | " | β-phenylethyl | " |
| " | " | cyclohexyl | " |
| " | " | phenyl | " |
| ethyl | " | 4-methoxyphenyl | " |
| " | " | methyl | bromine |
| " | " | ethyl | " |
| " | " | " | chlorine |
| " | " | " | methylsulphonyl |
| " | " | " | p-toluene-sulphonyl |
| " | " | " | dimethylamido sulphonyl |
| " | " | " | methoxy |

TABLE 1-continued

[Structure: R-N=C with naphthalene bearing U, connected to phenyl-N(R₁)(R₂)]⁺ Cl⁻

| R₁ | R₂ | | U |
|---|---|---|---|
| " | " | " | ethyl |
| " | " | " | methylmercapto |
| " | " | " | ethylmercapto |
| " | " | " | phenylmercapto |
| " | " | " | 4-tolyl-mercapto |
| " | " | " | 4-chloro-phenylmercapto |
| " | " | " | cyano |
| " | " | " | acetamino |
| " | " | " | diacetamino |
| " | " | " | phthalimido |
| " | " | " | phenylamino |
| " | " | " | 4-methoxy-phenylamino |
| " | " | " | dimethylamino |
| " | " | " | methyl-sulphonylamino |
| ⟩droxyethyl | ethyl | phenyl | hydrogen |
| ıloroethyl | methyl | 4-ethoxyphenyl | " |
| " | " | cyclohexyl | " |
| " | benzyl | benzyl | " |
| " | ethyl | ethyl | bromine |
| opyl | β-chloroethyl | " | " |
| ⟩ropyl | " | " | " |
| tyl | " | " | " |
| ⟩utyl | " | " | " |
| ntyl | " | " | " |
| xyl | " | " | " |
| ] | " | n-propyl | " |
| " | " | iso-propyl | " |
| " | " | n-butyl | " |
| " | " | iso-butyl | " |
| " | " | n-hexyl | " |
| ıloroethyl | " | ethyl | " |
| ⟩anoethyl | " | " | " |
| ethoxyethyl | " | " | " |
| ıloroethyl | β-cyanoethyl | " | " |
| " | " | β-cyanoethyl | " |
| ıoxycarbonyl-ıyl | β-chloroethyl | ethyl | " |
| xycarbonyl-ıyl | " | " | " |
| ethoxy-onylethyl | " | " | " |

TABLE 2

[Structure with R-N=C, naphthalene bearing U, tetramethyl-substituted tetrahydroquinoline-like system with N-R₁]⁺ Cl⁻

| R | R₁ | U |
|---|---|---|
| methyl | β-hydroxyethyl | hydrogen |
| " | β-chloroethyl | " |
| ethyl | " | " |

TABLE 2-continued

| R | R₁ | U |
|---|---|---|
| " | " | chlorine |
| " | " | bromine |
| " | " | cyano |

TABLE 2-continued

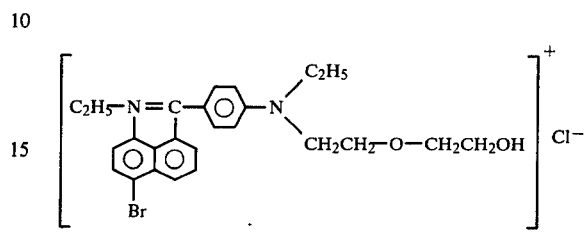

| R | R₁ | U |
|---|---|---|
| " | " | acetylamino |
| " | " | dimethylamidosulphonyl |
| " | " | methylmercapto |
| " | " | ethylmercapto |
| " | " | phenylmercapto |
| β-chloroethyl | ethyl | hydrogen |
| " | " | bromine |
| " | n-butyl | " |
| " | β-chloroethyl | " |
| β-cyanoethyl | " | hydrogen |
| n-butyl | β-hydroxyethyl | " |
| β-chloroethyl | β-cyanoethyl | " |
| " | " | chlorine |

Examples of alcohols III are: ethyleneglycol, 1,3-dihydroxypropane, 1,4-dihydroxybutane, glycerol, 2,2-dimethyl-1,3-propanediol, 1,6-hexanediol and 3,3-bis-hydroxymethylpentane and corresponding alkenes and alkines, such as 2-butene-1,4-diol, 2-methylene-1,3-propanediol and 2-butine-1,4-diol, and aliphatic ethers and thioethers which contain at least 2 hydroxyl groups, such as diethyleneglycol triethyleneglycol and tetraethyleneglycol and bis-(2-hydroxyethyl)sulphide. Ethyleneglycol and 1,3-dihydroxypropane are particularly suitable.

The dyestuffs prepared according to the invention are particularly suitable for dyeing, printing and bulk dyeing polyacrylonitrile but can also be employed for the other known fields of application of basic dyestuffs, for example for dyeing acid-modified polyamide fibres. They are distinguished by outstanding solubility in water, a capacity for combination without difficulty with commercially available dyestuffs and very good fastness to light, wet processing, rubbing and decatising and by the fact that they are not sensitive to foreign ions, especially thiocyanate ions, which, in industrially important dyeing processes, are frequently carried into the dyebaths as a result of the procedure.

EXAMPLE 1

50 g of the dyestuff of the formula

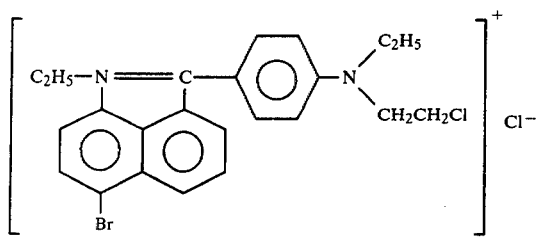

are heated with 80–100 g of ethylene glycol, with the addition of 5 g of active alumina (commercially available formulation, for example ®Tonsil) for 24 hours at 135°–140° C. and the mixture is then filtered. This gives a concentrated solution, which is ready for use and stable to cold, of the dyestuff of the formula

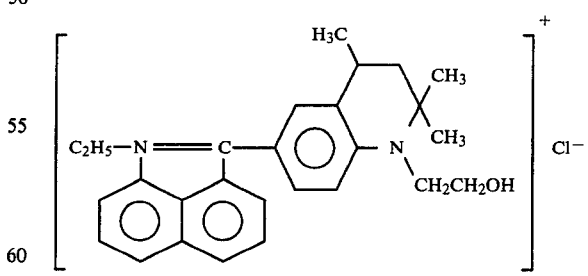

which on polyacrylonitrile gives reddish-tinged blue dyeings and prints which are fast to light. The dyestuff can be combined without difficulty with other commercially available dyestuffs, such as Basic Yellow 28, Basic Red 18 and Basic Red 46 and a solution of the dyestuff in water is, within wide limits, not sensitive to thiocyanate ions.

The starting dyestuff is obtainable by known processes, for example by a condensation reaction of N-ethyl-4-bromo-1,8-naphtholactam with N-ethyl-N-β-hydroxyethylaniline or N-ethyl-N-β-chloroethyl-aniline in phosphorus oxychloride, preferably with the addition of phosphorus pentoxide. If, instead of this dyestuff, the dyestuffs which are indicated in Tables 1 and 2 and are obtainable analogously are used, in an equivalent amount of each case, an otherwise unchanged procedure again gives valuable blue dyestuffs with similar colouristic properties. Active aluminium oxide can also be used in place of Tonsil.

EXAMPLE 2

50 g of the dyestuff of the formula are heated with 100–150 g of ethylene glycol, with the addition of 2 g of active aluminium oxide, for 30 hours at about 140° C. and the mixture is then filtered. This gives a ready-to-use solution of the dyestuff of the formula

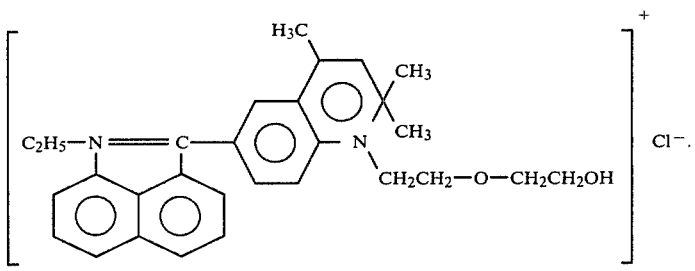

which on polyacrylonitrile gives reddish-tinged blue dyeings and prints which have very good fastness to light. The dyestuff can be combined without difficulty with other commercially available dyestuffs, such as Basic Yellow 28, Basic Red 18 and Basic Red 46 and a solution of the dyestuff in water is, within wide limits not sensitive to thiocyanate ions.

The starting dyestuff is obtainable from 2,2,4-trimethyltetrahydroquinoline, which is obtainable by hydrogenation of the compound

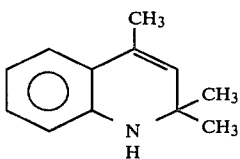

by an addition reaction with ethylene oxide, acetylation of the resulting oxethyl derivative, a condensation reaction with N-ethylnaphtholactam and subsequent hydrolytic elimination of the acetyl group, in a manner analogous to that described in DT-OS (German Published Specification) No. 2,314,606. If, instead of N-ethylnaphtholactam, N-methyl-, N-β-cyanoethyl, N-n-propyl-, N-iso-propyl-, N-n-butyl, N-iso-butyl-, N-n-amyl-, N-iso-amyl- or N-n-hexyl-1,8-naphtholactam, of one of their p-bromo or p-chloro derivatives, which are obtainable by bromination or chlorination, is used, in the equivalent amount in each case, similarly valuable dyestuffs are obtained. If protection of the hydroxyl group by acetylation is dispensed with, the hydroxyl group is replaced by chlorine. These β-chloroethyl dyestuffs can also be reacted with ethylene glycol to give the same dyestuffs according to the invention.

EXAMPLE 3

50 g of the dyestuff of the formula

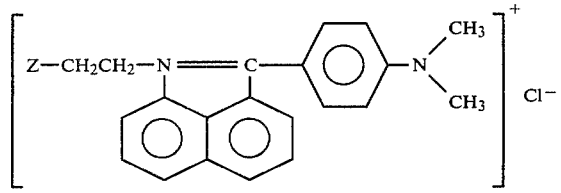

wherein Z represents chlorine, are warmed with 80 g of ethylene glycol, with the addition of 2 g of silica gel (commercially available product for chromatographic purposes) or 1 g of active zeolite, for about 20 hours to 140° C. and the mixture is then filtered. This gives a ready-to-use, highly concentrated solution of the blue-violet dyestuff of the formula

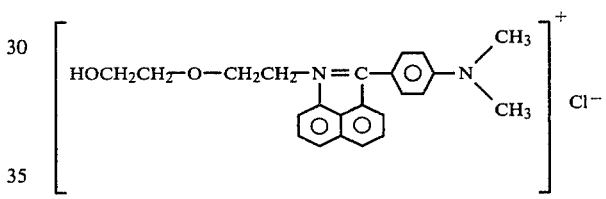

which is distinguished by outstanding solubility in water and polar organic solvents and by the fact that it is not sensitive to thiocyanate ions.

The dyestuff in which Z=hyroxyl can also be employed in the same way. The preparation of both dyestuffs is described in Example 3 of S.U. Patent No. 116,643. In place of these two dyestuffs, it is also possible to employ the corresponding dyestuffs obtained from N,N-diethylaniline, di-propylaniline or dibutylaniline, and titanium oxide, zirconium oxide or thorium oxide, or mixtures of these oxides, can also be employed as catalysts.

EXAMPLE 4

25 g of the dyestuff of the formula

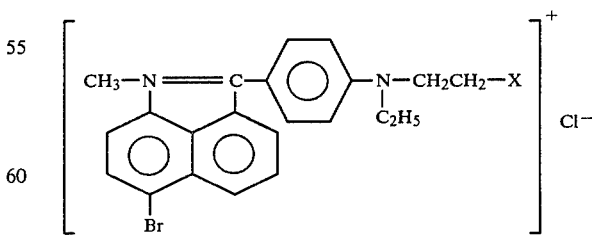

wherein X denotes chlorine, are heated with 50 g of 1,3-dihydroxypropane, with the addition of 5 g of Tonsil or aluminium oxide, for 24 hours at 140° C. After filtering, this gives a solution of the dyestuff of the formula

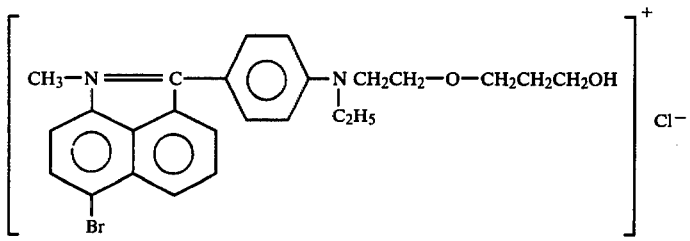

which, on PAN, gives very fast, reddish-tinged blue dyeings and prints.

The dyestuff in which X represents bromine or a hydroxyl group can also be employed in place of the dyestuff in which X=chlorine.

EXAMPLE 5

25 g of the dyestuff of the formula

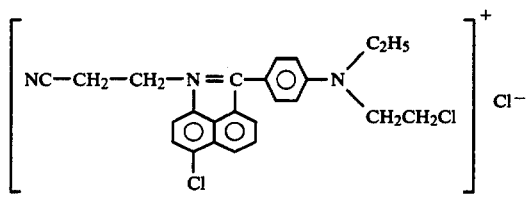

are heated with 100 g of 1,4-dihydroxybutane, with the addition of 3 g of aluminium oxide and whilst continuously distilling off the tetrahydrofurane which is also formed during the reaction, for 20 hours at 135° C. After filtering, this gives a solution of the dyestuff of the formula

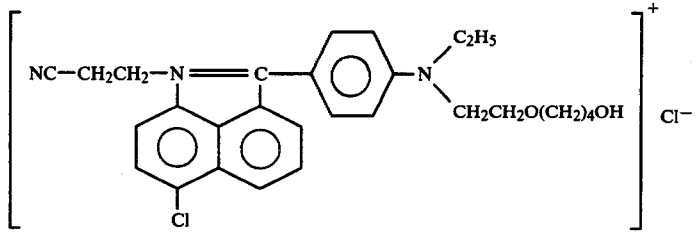

which, on PAN, gives very fast, reddish-tinged blue dyeings and prints.

In place of dihydroxybutane, it is also possible to use diglycol, in which case the corresponding dyestuff is formed, with simultaneous formation of dioxane. Triglycol and tetraglycol, or mixtures of glycol with these polyglycols, can also be used.

EXAMPLE 6

If the procedure of Example 1 is employed and the ethylene glycol is partly or wholely replaced by 2,2-dimethyl-1,3-propanediol, 3,3-bis-hydroxymethylpentane or 2-methylene-1,3-propanediol, dyestuff solutions with similarly valuable properties are again obtained.

What is claimed is:

1. A process for the preparation of a dyestuff of the formula

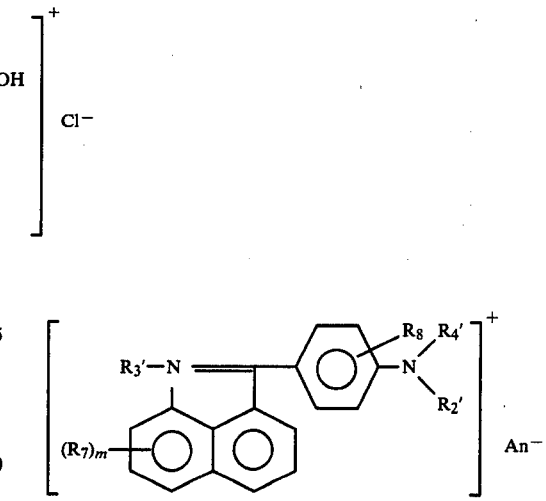

wherein $R_3'$ and $R_4'$ independently of one another represent $C_1$–$C_6$-alkyl, which can be substituted by a $C_1$–$C_4$-alkoxy, cyano, aminocarboxyl or $C_1$–$C_4$-alkoxycarbonyl group, and at least one of the radicals $R_3'$ or $R_4'$ is the radical

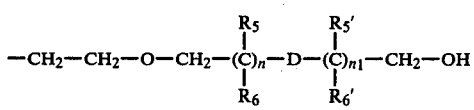

$n$ and $n_1$ independently of one another denote 0, 1 or 2, $R_5$ and $R_5'$ independently of one another denote hydrogen, methyl, ethyl or hydroxyl, $R_6$ and $R_6'$ independently of one another denote hydrogen, methyl or ethyl, or $R_5$ and $R_6$ conjointly denote methylene or ethylidene, D denotes a direct bond, vinylene, ethinylene, sulphur or —O—$(CH_2$—$CH_2O)_x$, $x$=0, 1 or 2, $R_2'$ represents $C_1$–$C_6$-alkyl, which can be substituted by a $C_1$–$C_4$-alkoxy, cyano, aminocarbonyl or $C_1$–$C_4$-alkoxycarbonyl group; or represents phenyl, cyclopentyl, cyclohexyl, benzyl or phenylethyl, which, in the rings, can be substituted by 1-5 halogen or $C_1$–$C_4$-alkyl groups or by 1 or 2 hydroxyl, $C_1$–$C_4$-alkoxy or nitro groups, $R_7$ represents $C_1$–$C_6$-alkyl, halogen, hydroxyl, $C_1$–$C_4$-alkoxy, cyano, aminocarbonyl, $C_1$–$C_4$-alkoxycarbonyl, amino, acetylamino, mono- and di-$C_1$–$C_4$-alkylamino, $C_1$–$C_4$-alkylsulphonylamino, $C_1$–$C_4$-alkylmercapto, cyanoethylmercapto, phenylmercapto, phenylmercapto substituted by chlorine or methyl, or aminosulphonyl or $C_1-C_4$-alkylsulphonyl, $R_8$ represents hydrogen, methyl, ethyl or $C_1-C_4$-alkoxy or a $R_8$ which is in the o-position relative to the nitrogen represents, conjointly with $R_2$, propylene-(1,2) ethylene, methyl-substituted propylene-(1,3) or methyl-substituted ethylene, m represents 0, 1 or 2 and $An^-$ represents an anion, consisting essentially reacting a dyestuff of the formula

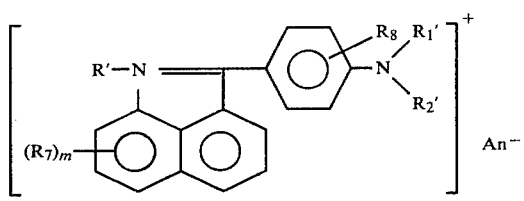

V wherein $R'$ and $R_1'$ independently of one another represent $C_1-C_6$-alkyl, which can be substituted by a $C_1-C_4$-alkoxy, cyano, aminocarbonyl or $C_1-C_4$-alkoxycarbonyl group, and at least one of the radicals $R'$ and $R_1'$ is ethyl substituted by chlorine, bromine or hydroxyl, with a polyhyric alcohol of the formula

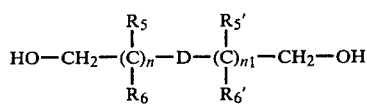

at 80° to 160° C. in the presence of a catalyst selected from the group consisting of an aluminium oxide, active alumina, silica, active zeolite finely divided platinum, phosphorus pentoxide, polyphosphoric acid, phosphoric acid, sulfuric acid, titanium oxide, zirconium oxide, thorium oxide and polystyrene-sulphonic acids.

2. A process according to claim 1, wherein aluminium oxide, silica, active alumina (bleaching earth) or platinum is used as the catalyst.

3. A process according to claim 1 in which the polyhyric alcohol has the formula

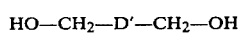

in which $D'$ is a direct bond, methylene, ethylene or a radical of the formula

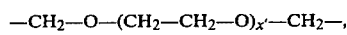

and $x'$ is 0, 1 or 2, and the starting dyestuff has the formula

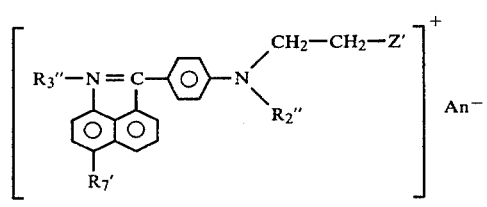

or

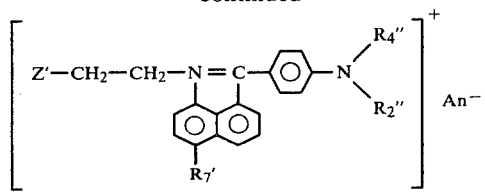

in which
$R''_2$ and $R''_3$ independently of one another represent methyl, ethyl, β-cyanoethyl, n- or iso-propyl or n-butyl,
$R_7'$ represents hydrogen, chlorine or bromine and
$Z'$ represents chlorine or hydroxyl,
$Z'$ being replaced in the end product by —O—$CH_2$—D'—$CH_2$—OH.

4. A process according to claim 3, in which the polyhydric alcohol is ethylene glycol or 1,3-dihydroxypropane.

5. A process according to claim 4, in which the polyhydric alcohol is ethylene glycol or 1,3-dihydroxypropane.

6. A process according to claim 1 in which the polyhydric alcohol has the formula $$HO-CH_2-D'-CH_2-OH$$

in which $D'$ is a direct bond, methylene, ethylene or a radical of the formula $$-CH_2-O-(CH_2-CH_2-O)_{x'}-CH_2-,$$

and
and the starting dyestuff has the formula

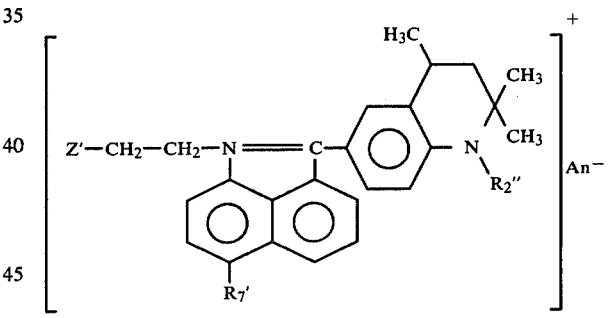

or

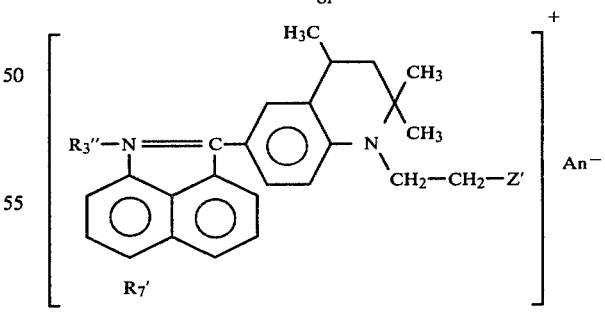

in which
$R''_2$ and $R''_3$ independently of one another represent methyl, ethyl, β-cyanoethyl, n- or iso-propyl or n-butyl,
$R_7'$ represents hydrogen, chlorine or bromine and
$Z'$ represents chlorine or hydroxyl,
$Z'$ being replaced in the end product by —O—$CH_2$—D'—$CH_2$—OH.

* * * * *

UNITED STATES PATENT AND TRADEMARK OFFICE
CERTIFICATE OF CORRECTION

PATENT NO. : 4,283,540
DATED : Aug. 11, 1981
INVENTOR(S) : Alfred Brack

It is certified that error appears in the above—identified patent and that said Letters Patent are hereby corrected as shown below:

Column 16, line 32   Insert --x' is 0, 1 or 2,-- after "and".

Signed and Sealed this

Second Day of February 1982

[SEAL]

Attest:

GERALD J. MOSSINGHOFF

Attesting Officer   Commissioner of Patents and Trademarks